United States Patent [19]

Fredette

[11] 4,393,035

[45] Jul. 12, 1983

[54] CHLORINE DIOXIDE PRODUCTION USING MIXED HYDROCHLORIC AND SULFURIC ACID FEED

[75] Inventor: Maurice C. J. Fredette, Mississauga, Canada

[73] Assignee: ERCO Industries Limited, Islington, Canada

[21] Appl. No.: 317,518

[22] Filed: Nov. 2, 1981

[30] Foreign Application Priority Data

Nov. 17, 1980 [GB] United Kingdom ................. 8036835

[51] Int. Cl.³ .................... C01B 11/02; C01B 7/01; C01B 17/74
[52] U.S. Cl. ................................. 423/478; 423/486; 423/522; 422/161; 422/200; 422/211
[58] Field of Search ................ 423/478, 481, 486, 488

[56] References Cited

U.S. PATENT DOCUMENTS

| | | | |
|---|---|---|---|
| 3,347,628 | 10/1967 | Sepall | 423/478 |
| 4,086,329 | 4/1978 | Cowley | 423/478 |
| 4,105,751 | 8/1978 | Caillol | 423/478 |

Primary Examiner—Brian E. Hearn
Attorney, Agent, or Firm—Sim & McBurney

[57] ABSTRACT

A chlorine dioxide generating process is described wherein chlorine formed with the chlorine dioxide is used to form acid reactant for the chlorine dioxide generating process by reaction with sulphur dioxide and water. The substantial evaporation of the water which would otherwise result from the exothermic nature of the reaction is prevented by controlling the temperature of the water during the reaction. In one embodiment, the temperature control is achieved by effecting the reaction in a cooled falling film absorber having integral cooling passages and to which liquid water is fed to form the falling film. In another embodiment, the reaction is effected in a packed tower with a substantial proportion of the product acid being recycled through an external heat exchanger and diluted with water.

22 Claims, 4 Drawing Figures

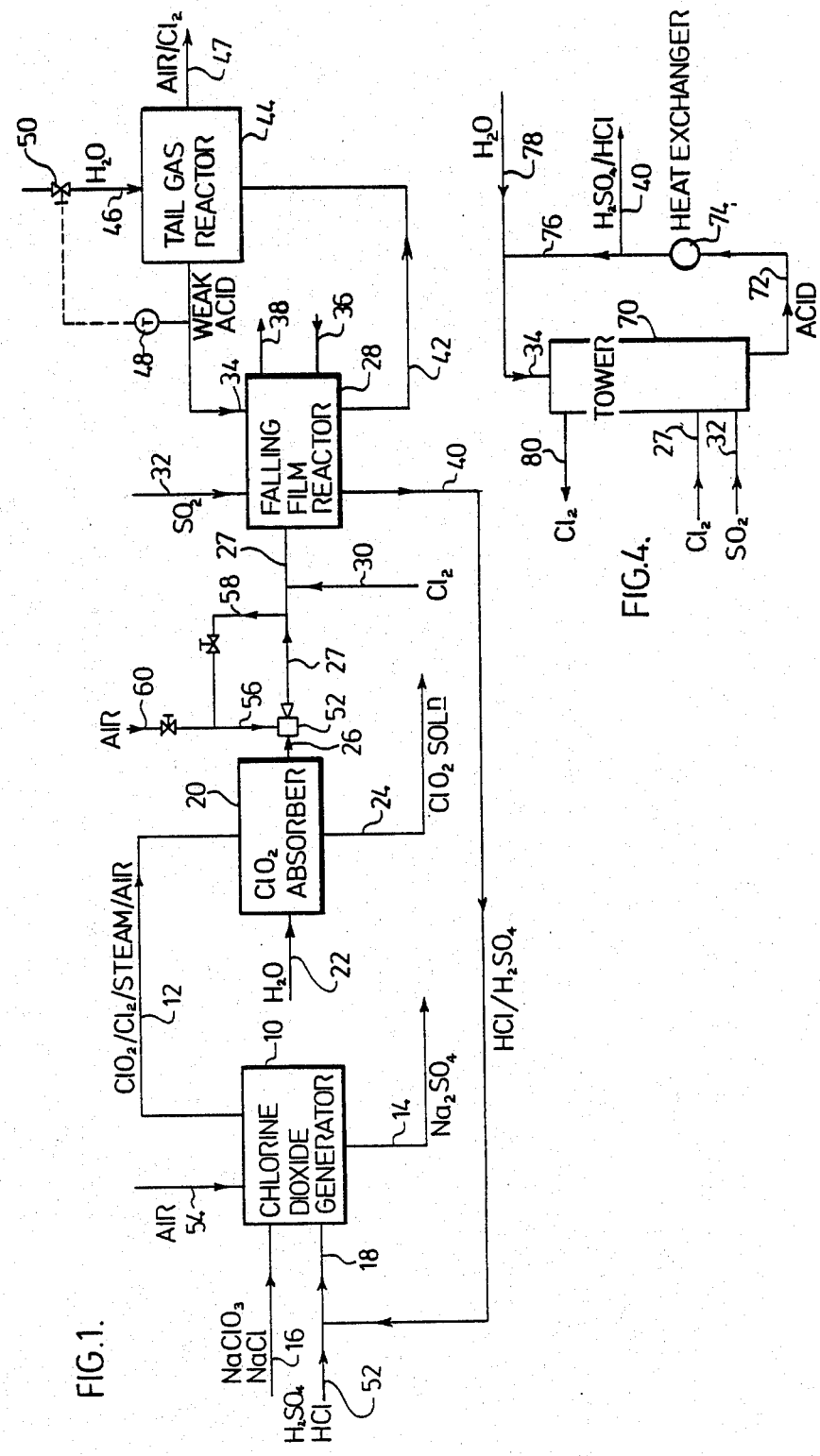
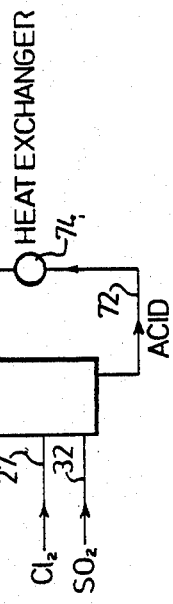
FIG.1.
FIG.4.

CHLORINE DIOXIDE PRODUCTION USING MIXED HYDROCHLORIC AND SULFURIC ACID FEED

FIELD OF INVENTION

The present invention relates to the production of chlorine dioxide and in particular to the formation of a mixed acid feed of hydrochloric acid and sulphuric acid for use therein.

BACKGROUND OF THE INVENTION

In U.S. Pat. No. 3,864,456 (E26), assigned to the assignee of this application, there is described a process for the production of chlorine dioxide and chlorine wherein sodium chlorate is reduced with added chloride ions in an aqueous acid reaction medium containing sulphuric acid at a low total acid normality in the range of about 2 to about 4.8 normal. The reaction medium is maintained at its boiling point under a subatmospheric pressure, so that chlorine dioxide and chlorine are removed from the reaction zone in gaseous admixture with steam. By-product anhydrous neutral sodium sulphate is deposited from the reaction medium once the reaction medium becomes saturated therewith after start-up. The gaseous mixture of chlorine dioxide, chlorine and steam removed from the reaction zone is contacted with water, usually after at least partial condensation of the steam, to form a chlorine dioxide solution also containing dissolved quantities of chlorine.

It has previously been suggested in U.S. Pat. No. 3,347,628 to form an aqueous chlorine dioxide solution from a gaseous mixture of chlorine dioxide, chlorine and steam formed from a chlorine dioxide generator to which external steam is added to dilute the gases, by contact of the gaseous mixture with water. The chlorine gas remaining from the absorption is reacted with sulphur dioxide and water to form sulphuric acid and hydrochloric acid, which are fed to the generator.

As is set forth in detail in U.S. Pat. No. 4,086,329 (E.124), assigned to the assignee of this application, the latter concept is not directly utilizable in the process of U.S. Pat. No. 3,864,456, since the chemical efficiency of chlorine dioxide production under the boiling reaction medium, subatmospheric pressure and low total acid normality conditions of the latter process is less than 100%. As described in U.S. Pat. No. 4,086,329, a critical adjustment of the hydrogen ion and chloride ion concentrations of the acid feed is required to take this inefficiency into account, otherwise continuous operation is impractical.

The reaction of chlorine, sulphur dioxide and water is described in U.S. Pat. No. 3,347,628 as being effected in a packed tower. The reaction is highly exothermic and yet no provision is made in this prior art procedure for cooling the packed tower reactor. The heat generated by the reaction elevates the temperature of the water and may readily cause evaporation of water, with consequently-incomplete dissolution of the hydrogen chloride gas into the aqueous product stream. The incomplete dissolution of the hydrogen chloride results in an improper proportion of hydrochloric acid in the acid stream recycled to the generator and the necessity for further processing of the gaseous outlet stream to remove the gaseous hydrogen chloride therefrom.

One obvious solution to this problem is to substantially increase the volume of water flowing into the reactor, so that the volume of water is sufficient also to effect cooling and prevent the aqueous medium from boiling. However, this procedure is impractical and uneconomic, in that the additional volume of water considerably dilutes the acid feed for the reactor, and may require increased reactor capacity, with consequently increased capital cost.

Dilution of the strength of the mixed acid by the increased volume of water results in this additional volume of water entering the chlorine dioxide generator and requiring a correspondingly-increased volume of water to be evaporated from the generator. The requirement to increase the volume of water evaporated in turn leads to an increased heat requirement, usually in terms of steam, since steam is the heating medium usually employed. The increased heat requirement results in substantially increased operating costs, which render the process uneconomic.

A procedure in which the by-product chlorine from the chlorine dioxide absorption is reacted with sulphur dioxide and water to form a mixture of sulphuric acid and hydrochloric acid for reuse in the generator nevertheless is a commercially-attractive one. Since hydrochloric acid is used to provide at least part of the chloride ion requirement for the chlorine dioxide-producing process, the overall amount of sodium sulphate produced per mole of chlorine dioxide produced is decreased, as is apparent from consideration of the following equations, which represent the reactions which occur when a mixture of hydrochloric acid and sulphuric acid is used.

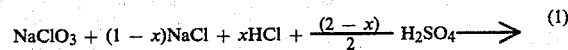

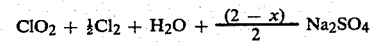

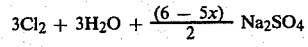

wherein x is the molar proportion of HCl which is used and is a decimal value which is less than or equal to 1.00. Equation (1) represents the reaction which produces chlorine dioxide and the extent to which the reaction of equation (1) predominates over equation (2) is the efficiency of chlorine dioxide production.

It will be seen that the proportion of sodium sulphate which is produced declines as the proportion of hydrochloric acid used in place of sodium chloride and sulphuric acid increases. The requirements of pulp mills for sodium sulphate have declined while the requirements for chlorine dioxide have increased. The ability to produce less sodium sulphate for the same chlorine dioxide output through the use of hydrochloric acid, therefore, is beneficial.

Further, since chlorine gas remaining from the absorption of chlorine dioxide from the product gas stream is reacted to form reutilizable chemicals, the necessity for separate absorption of chlorine, usually in sodium hydroxide solution to form hypochlorite, is substantially decreased. With the increasing modern tendency to substitute chlorine dioxide for a substantial proportion of the chlorine which has formerly been used to effect bleaching in the first stage of a multistage bleaching operation, the requirement for chlorine has decreased, while that for chlorine dioxide has increased.

The problem to which the present invention is directed, therefore, is how to utilize the reaction of sulphur dioxide and water with chlorine from the chlorine dioxide-producing reaction and addition of that reaction product to a chlorine dioxide generating process without the prior art difficulties of loss of hydrogen chloride and increased evaporative load, and thereby achieve the benefits thereof referred to above.

SUMMARY OF INVENTION

In accordance with the present invention, this problem is overcome by controlling the temperature of the aqueous phase as it passes through the reaction zone wherein the sulphur dioxide, chlorine and water react, so that the aqueous phase is below the boiling point at all times as it passes through the reaction zone. This temperature control is effected by cooling the aqueous phase by heat exchange with the aqueous phase using a suitable cool heat exchange medium.

Since the aqueous phase is maintained below its boiling point, a mixture of hydrochloric acid and sulphuric acid may be obtained without loss of hydrogen chloride and further at a concentration which does not significantly upset the water balance of the process.

In one specific embodiment of the invention, the reaction between the chlorine, sulphur dioxide and water is effected mainly in a cooled falling film absorber in which the aqueous phase constitutes the falling film. In another specific embodiment of the invention, the reaction between the chlorine, sulphur dioxide and water is effected in a packed tower and the acid so produced is recirculated through an external cooled heat exchanger.

It has previously been thought that the reaction between sulphur dioxide, chlorine and water could be most effectively conducted in the gaseous phase, using water in the form of steam, in view of the gaseous form of the sulphur dioxide and chlorine. However, the exothermic nature of the reaction requires a large capacity reactor and considerable cooling to provide the mixture of sulphuric acid and hydrochloric acid. This suggestion is, therefore, considered unsatisfactory.

GENERAL DESCRIPTION OF INVENTION

As noted above, the present invention involves reaction of sulphur dioxide with chlorine while the water, which provides both one of the reactants and the absorption medium for the gases and the product, is maintained in the liquid phase by effecting heat exchange to remove heat of reaction. Since the partial pressure of hydrogen chloride increases with increasing aqueous phase temperature, it is usually preferred to maintain the temperature below about 70° C.

When the reaction is effected mainly in a falling film absorber wherein the water constitutes the falling film, the chlorine and sulphur dioxide gases are readily absorbed by the aqueous phase for reaction. The integral cooling passages in the falling film absorber, through which a cool heat exchange medium, usually water, is passed, enable the exothermic reaction to be controlled, so that the water remains in the aqueous phase and hence the hydrogen chloride which is formed remains dissolved in the aqueous phase leaving the reactor. By using a cooled falling film, the cooling of the aqueous phase and the product-forming reaction are effected simultaneously.

As the gases pass through the falling film absorber and reaction with the water occurs, the partial pressure of chlorine and sulphur dioxide in the gaseous phase decreases, thereby resulting in a decrease of the mass transfer rate of the gases to the liquid phase. Accordingly, for an increasing proportion of the chlorine and sulphur dioxide to react, an increasing reactor volume must be employed.

While it is possible to effect close to complete reaction of the sulphur dioxide and chlorine in a falling film absorber, for reasons of economy of reactor volume, it is usual to leave a remaining proportion of the sulphur dioxide and chlorine unreacted. These unreacted gases are forwarded to a second reactor, usually in the form of a packed tower, wherein the tail gas sulphur dioxide and chlorine react with water to form a weak acid stream which forms the aqueous feed to the primary reactor.

The proportion of unreacted gases may vary widely, depending on a balance of falling film reactor volume and tail gas reactor volume. Since the tail gas reactor relies for cooling on the volume of water fed thereto and reactor size, it is usual for at least a major proportion of the reaction to be effected in the falling film reactor, usually at least about 75% of the reaction and typically about 80%.

Where the sulphur dioxide has a substantial proportion of air associated therewith, for example, when a sulphur burner is used as the source of the sulphur dioxide, a falling film absorber is less suitable in view of the increased volume of gases requiring absorption and the consequently-increased size required to provide the mass transfer area. A packed tower is more suitable under these circumstances with the temperature control being effected by recycling acid through a cooled external heat exchanger.

The strength of acid which is produced by the reaction of sulphur dioxide, chlorine and water is largely determined by the flow rate of the water to the reaction zone wherein the reaction is effected. As a stronger acid is produced, more external cooling is required since the volume of water reactant producing cooling is less. The lower limit of total acid normality which can be produced without the necessity for cooling varies depending on the temperature of the water which is fed to the reaction zone wherein the reaction occurs. The colder the water, the stronger the mixed acid that can be produced without boiling occurring.

The volume of water introduced to the reaction medium with the mixed acid feed, and hence the strength of the acid feed, determines to some extent the volume of water which must be evaporated from the reaction medium to maintain a constant volume of reaction medium in the generator vessel. Assuming that other sources of water remain the same, as the strength of mixed acid increases, the volume of water required to be evaporated decreases. However, as the volume of water evaporated decreases, the production rate of chloride dioxide declines. As the strength of mixed acid decreases, the volume of water required to be evaporated increases and hence the external heat requirement increases.

A typical total acid normality of the hydrochloric acid and sulphuric acid feed produced by the procedure of the invention is 8 normal and it is preferred from an overall water balance standpoint to utilize total acid normality in the range of about 7 to about 9 normal.

A broader range of total acid normality of about 6 to about 14 normal for the mixed acid feed may be used, however. The outer limits are less advantageous, since, at total acid normalities below about 7 normal, the evaporative heat requirements increase dramatically and below about 6 normal are a significant economic burden. At total acid normalities above about 9 normal, the volume of water required to be evaporated decreases significantly producing a significantly decreased production rate, although the latter difficulty may be overcome by increasing the water input to the reaction medium from other sources. At these higher total acid normalities the cooling requirement for the reactor also increases, as does the partial pressure of hydrogen chloride in the mixed acid.

The evaporative load on the reaction medium usually is such as to produce a weight ratio of steam to chlorine dioxide in the product gas stream of about 7:1, although, based on the strength of the mixed acid feed and the volume of water from other sources, the weight ratio may vary from about 4:1 to about 10:1.

BRIEF DESCRIPTION OF DRAWINGS

FIG. 1 is a schematic flow sheet of one embodiment of the invention;

FIG. 4 is a partial flow sheet of a second embodiment of the invention.

DESCRIPTION OF PREFERRED EMBODIMENT

Figure 2:
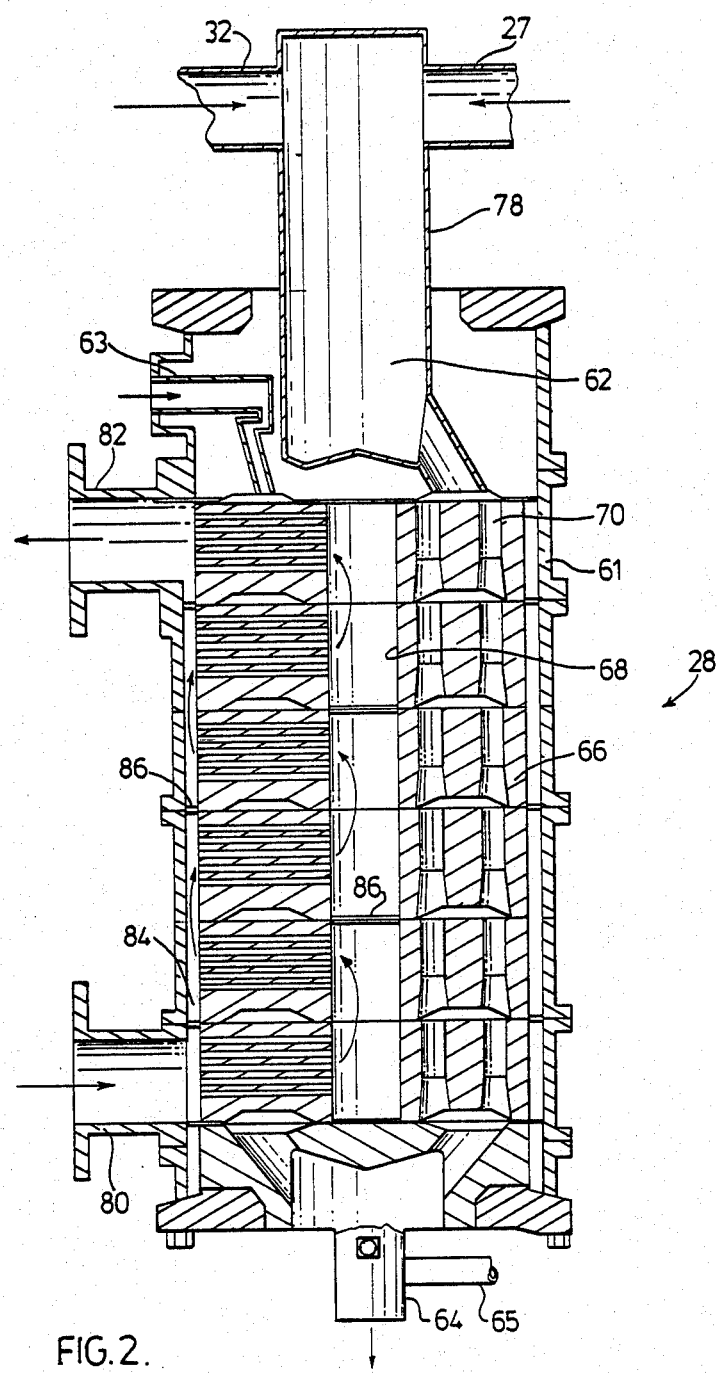
FIG. 2 is a detail sectional view of the tower which is used to effect reaction of sulphur dioxide, chlorine and water in the embodiment of FIG. 1.
Figure 3:
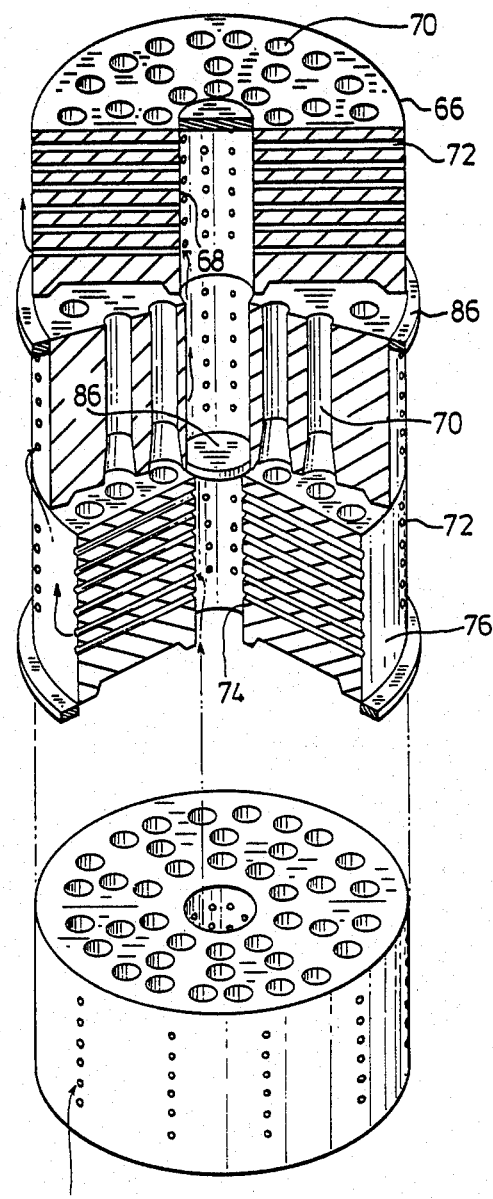
FIG. 3 is a perspective, part-sectional view of a detail of the tower of FIG. 2.

Referring first to FIGS. 1 to 3, chlorine dioxide is formed continuously in accordance with the process of U.S. Pat. No. 3,864,456 in a chlorine dioxide generator 10. Chlorine dioxide, chlorine and steam are formed in the generator 10 as the gaseous products of reaction and are continuously removed by line 12. Anhydrous neutral sodium sulphate is also formed in the generator 10 as the solid product of reaction and is continuously or intermittently removed by line 14.

The generator 10 holds an aqueous acid reaction medium containing chlorate ions which are continuously fed thereto in the form of a sodium chlorate solution by line 16. The sodium chlorate solution fed by line 16 may take the form of cell liquor, in which case the feed stream also contains sodium chloride. The reaction medium is maintained at its boiling point under a subatmospheric pressure and has a total acid normality of about 2 to about 4.8 normal. The acid is provided by a mixture of sulphuric acid and hydrochloric acid, continuously fed to the generator by line 18.

The gaseous mixture of chlorine dioxide, chlorine and steam is forwarded, usually after an initial cooling to condense at least a major proportion of the steam in a cooler (not shown), to a chlorine dioxide absorber 20 to which water is fed by line 22 to dissolve the chlorine dioxide therefrom and form a product solution stream of chlorine dioxide solution in line 24. Some of the chlorine contained in the gaseous mixture in line 12 also is dissolved in the chlorine dioxide solution.

The residual chlorine gas stream is forwarded by lines 26 and 27 to a reactor 28 wherein the chlorine, supplemented, if required, by external source chlorine in line 30, is reacted with sulphur dioxide fed by line 32 and weak acid fed by line 34. In accordance with this embodiment of the invention, the reactor 28 takes the form of a cooled falling film absorber having integral cooling passages therein, the details of construction of which are shown in FIGS. 2 and 3 and described below. Cooling water is fed by line 36 and removed by line 38.

Residual unreacted gases leave the reactor 28 by line 42 and pass to a tail gas reactor 44 to which water is fed by line 46. The tail gas reactor 44 takes the form of a small packed column wherein any residual sulphur dioxide and at least part of the residual chlorine are absorbed and reacted. Residual air along with any residual unreacted chlorine are vented by line 47.

The primary reactor 28 and the tail gas reactor 44 constitute a reaction zone to which chlorine reactant is fed by line 27, sulphur dioxide reactant is fed by line 32 and water reactant and absorber is fed by line 46, to produce a mixed acid product stream of hydrochloric acid and sulphuric acid in line 40.

Usually the primary reactor 28 and the tail gas reactor 44 are relatively sized so that, at most, only a minor proportion of the sulphur dioxide reactant fed by line 32 leaves in the tail gas stream 42, so that the volume of fresh water fed by line 46 to the reactor 44 is sufficient to provide cooling of the exothermic reaction in the tail gas reactor 44.

The aqueous stream emanating from the tail gas reactor 44 is a weak mixed acid stream and forms the aqueous feed stream 34 to the primary reactor 28. The flow rate of fresh water in line 46, in relation to the flow rates of chlorine in line 27 and sulphur dioxide in line 32, and hence of weak acid in line 34, controls the total acid normality of the product stream in line 40.

The flow of fresh absorbing water to the tail gas reactor 44 and thence to the main sulphur dioxide-chlorine-water reactor 28 may be controlled to provide for changes in the chlorine dioxide production rate. Such control may be provided by a temperature sensor 48 provided in the weak acid feed line 34 and a variable flow valve 50 provided in the fresh water feed line 46 and linked to the temperature sensor 48.

As the production rate of chlorine dioxide increases and, therefore, the production rate of chlorine increases, more sulphur dioxide is required to be fed to the reactor 28, but then more sulphur dioxide then passes through the reactor 28 if the feed rate of weak acid by line 34 is not suitably increased. As more sulphur dioxide reacts in the tail gas reactor 44, the temperature of the weak acid in line 34 increases, causing the temperature sensor 48 to open the valve 50 further to increase the flow of fresh water in line 46. As more fresh water flows in line 46, the volume of weak acid passing into the reactor 28 increases. The increased water flow results in more absorption of sulphur dioxide in the reactor 28 and less sulphur dioxide flowing to the tail gas reactor 44, so that the temperature of the weak acid in line 34 decreases. Decreases in chlorine dioxide production rate with corresponding decreases in sulphur dioxide feed rate requirement produce the reverse operation and result in a decreased volume of fresh water in line 46.

The hydrochloric acid and sulphuric acid solution resulting from the falling film absorber 28 in line 40 is recycled to the acid feed line 18. Additional quantities of sulphuric acid and hydrochloric acid required to maintain the stoichiometry of the reactions occurring in the generator 10 at the prevailing chlorine dioxide efficiency, are added by line 52, as described in detail in U.S. Pat. No. 4,086,329.

The efficiency of absorption of sulphur dioxide and chlorine in the falling film reactor 28 decreases as the volume of air increases, and hence the reactor volume requirement increases as the volume of air increases. Some air is inevitable, but the overall volume of air entering the reactor 28 may be controlled as follows. Vacuum is applied to the generator 10 by a vacuum ejector 52 located in line 26 and an air bleed line 54 communicates with the generator 10. The volume of air entering the ejector 52 by line 56 to control the vacuum applied to generator 10 is itself controlled by using a recycle of a mixture of chlorine and air in line 58 drawn from the gas stream in line 27 along with a minimized flow of fresh air by line 60.

Turning now to consideration of FIGS. 2 and 3, there are shown therein the details of construction of the reactor 28. The reactor 28 has a cylindrical body 61, an axial gaseous inlet 62, a radial liquid inlet 63, an axial outlet 64 for product solution and a radial outlet 65 for unreacted gases. A plurality of right cylindrical blocks 66 are superimposed within the cylindrical body 61. Each of the blocks 66 has a central axial opening 68 and a plurality of axially-extending bores 70 therethrough. Each of the blocks 66 also has a plurality of radially-extending bores 72 which extend from the inner surface 74 at the axial opening 68 and the outer surface 76 of the block 66 out of intersecting relationship with the axial bores 70.

The gaseous inlet 62 communicates with a feed pipe 78 to which the chlorine reactant is fed by line 27 and to which the sulphur dioxide reactant is fed by line 32. The weak acid in line 34 is fed to the liquid inlet 63 and forms a falling film flowing down the inside of bores 70 towards the liquid outlet 64. The gases are absorbed in the falling film and react exothermically to form hydrochloric acid and sulphuric acid.

A cooling water inlet pipe 80 communicates with line 36 while a cooling water outlet pipe 82 communicates with line 38. The inflowing cooling water passes through the radial openings 72 to the axial bore 68, upwardly to the bore 68 of the vertically-adjacent block 66 and through the radial openings 72 of the block to a channel 84 located between the exterior 76 of the block and the interior of the cylindrical wall 61. The water flows upwardly through the channel 84 to the exterior of the vertically-adjacent block, and through the radial openings 72 of the block to the central bore 68. This flow pattern is repeated throughout the height of the blocks 66 until the water reaches the outlet pipe 82. Suitable gaskets 86 are located between each vertically-adjacent pair of blocks 66 to effect guiding of the water flow in the above-described manner. The blocks 66 are constructed of suitable corrosion-resistant good heat transfer material, usually graphite, although tantalum may be used.

The water flow from the inlet 80 to the outlet 82 effects cooling of the liquid phase as it flows as a falling film through the bores 70 towards the liquid outlet 64. The temperature of the liquid phase is maintained by the cooling water below its boiling point at all times during its flow from the inlet 63 to the outlet 64 and preferably below about 70° C. The actual temperature of the liquid phase is to some extent dependent on the temperatures of the incoming weak acid in line 34 and the cooling water in line 36, and on the flow rate of the weak acid stream.

DESCRIPTION OF ALTERNATIVE EMBODIMENT

Turning now to consideration of FIG. 4, there is shown therein a second embodiment of the invention. In this embodiment, in place of the reaction zone comprising the falling film absorber 28 and the tail gas reactor 44, there is used a large packed tower 70 to which chlorine is fed by line 27, sulphur dioxide by line 32 and relatively weak acid by line 34.

The temperature of the weak acid entering the tower 70 and hence the temperature of the strong acid produced in the tower 70 is controlled by passing product strong acid leaving the tower 70 by line 72 through an external heat exchanger 74. A minor proportion of the cooled acid is removed by line 40 for recycle to the chlorine dioxide generator acid feed line 18, while the remaining major proportion is mixed with fresh water fed by line 78 to form the weak acid feed in line 34. Air present in the chlorine feed stream 27 and/or the sulphur dioxide feed stream 32 and any unreacted chlorine are removed from the tower 70 by line 80.

The embodiment of FIG. 4 is particularly suited to the case where air is associated with the sulphur dioxide to such an extent that the dimensional requirements of a falling film absorber to accommodate the volume of air become excessive.

Advantages of a process of the type described above with respect to the embodiments of FIGS. 1 to 4, wherein acid is regenerated internally, are that the external acid feed requirement is decreased, chlorine is consumed and the proportion of sodium sulphate per mole of chlorine dioxide produced can be decreased and controlled.

EXAMPLES

Example 1

This Example illustrates the process of the invention.

A reaction zone comprising the falling film reactor 28 and the tail gas reactor 44 of FIG. 1 was set up and a mixture of hydrochloric acid and sulphuric acid was produced from sulphur dioxide, chlorine and water. The flow rates and other parameters used are set forth in the following Table I:

TABLE I

| Stream | Line No. | Flow Rate |
| --- | --- | --- |
| $Cl_2$ feed stream | line 27 | 1245 pph $Cl_2$, 300 pph air |
| $SO_2$ feed stream | line 32 | 780 pph $SO_2$ |
| $H_2O$ feed stream | line 46 | 9.8 USGPM at 32° F. (0° C.) |
| Weak acid stream | line 34 | 10 USGPM of 1.5N acid at 100° F. (38° C.) |
| Recycle gas stream | line 42 | 117 pph $SO_2$, 510 pph $Cl_2$, 300 pph air |
| Tail gas stream | line 47 | 380 pph $Cl_2$, 300 pph air |
| Cooling water | line 36 | 242 USGPM in at 57° F. out at 64° F. |
| Mixed acid stream | line 40 | 11.0 USGPM of 8 N acid at 53° F. (12° C.) |

As may be seen from the results of Table I, the utilization of a cooled falling film absorber resulted in an 8 N mixed acid stream without boiling of the weak acid. The product mixed acid stream was suitable for utilization directly in a chlorine dioxide generator as an acid source thereto.

Example 2

The procedure of Example 1 was repeated except that mixed acid streams were produced at varying total acid normalities.

(a) The flow rate of water in line 46 was increased to 19.6 USGPM and the cooling water flow in line 36 was ceased, thereby producing 23.8 USGPM of 4 N mixed acid at 178° F. (80° C.). Although the 4 N acid stream was produced without the necessity for cooling, when compared with the 8 N acid stream of Example 1, the 4 N acid stream is inferior in that approximately 5000 pph of additional steam is required to evaporate the additional water from the generator. At a conservative cost of $3.00 per 1000 lb of steam, the additional operating costs amount to $126,000 per year.

(b) The flow rate of water in line 46 was increased to 13 USGPM and the cooling water stream in line 36 recommenced, forming 14.7 USGPM of 6 N mixed acid. It was attempted to repeat the experiment without the use of cooling water, but boiling occurred in the reactor 28 of FIG. 1.

It was further determined that the maximum strength of mixed acid could be attained in the reactor 28 without the necessity to cool the reactor 28 using a water feed stream in line 46 at 32° F. (0° C.) was 5.6 normal.

(c) To produce a 12 N mixed acid stream in line 40, the flow rate of water in line 46 in FIG. 1 was decreased to 6.54 USGPM, which produced 7.84 USGPM of 12 N mixed acid.

(d) A 14 N mixed acid stream was produced in line 40 by decreasing the flow rate of water in line 46 to 5.6 USGPM. The volume of acid produced was 6.29 USGPM. It was attempted to produce a mixed acid solution of higher strength by decreasing the flow rate of water in line 46 further. However, hydrogen chloride was lost from the acid as a result of its high partial pressure.

Example 3

The Example illustrates an alternative embodiment of the invention.

The reactor 70 of FIG. 4 was set up and run to produce a mixture of hydrochloric acid and sulphuric acid in line 40 from sulphur dioxide, chlorine and water. The flow rates and other parameters used are set forth in the following Table II:

TABLE II

| Stream | Line No. | Flow Rate |
|---|---|---|
| Cl$_2$ feed stream | line 27 | 1195 pph Cl$_2$, 300 pph air |
| SO$_2$ feed stream | line 32 | 780 pph SO$_2$ |
| H$_2$O feed stream | line 78 | 9.8 USGPM at 32° F. (0° C.) |
| Weak acid stream | line 34 | 51.7 USGPM of 7.2N acid at 44° F. (6.5° C.) |
| Mixed acid stream | line 72 | 53.8 USGPM of 8N acid at 101° F. (38° C.) |
| Product mixed stream | line 40 | 11.9 USGPM of 8N acid at 54° F. (12° C.) |
| Recycle acid stream | line 76 | 41.0 USGPM of 8N acid at 54° F. (12° C.) |
| Tail gas stream | | 301 pphCl$_2$, 300 pph air |

The product mixed acid stream was capable of utilization in a chlorine dioxide generating process and was produced without boiling of the aqueous phase during the sulphur dioxide, chlorine and water reaction.

Example 4

This Example illustrates the adverse effects of lack of control of the exothermic reaction in the production of mixed acid streams of specifically-intended total acid normalities.

(a) It was attempted to produce a 12 normal mixed acid stream using the procedure of Example 2 (c) above, except that cooling of the falling film reactor 28 was omitted. A feed stream of 6.54 USGPM of water at 54° F. (12° C.) was used in line 46.

The intention, as in Example 2(c), was to produce 7.84 USGPM of 12 normal mixed acid. Instead there was obtained 6.01 USGPM of a boiling (212° F., 100° C.) acid solution which was 15.4 N in acid and contained 22.4% HCl. It was found that the exothermic reaction had boiled off 1.83 USG of water and hydrogen chloride had been lost (pp of HCl about 270 mm Hg). Calculation showed the heat of reaction produced 6404 K Cal/min while the heat required to raise the water to the boiling point was only 2673 K Cal/min. The excess heat boiled off the water and caused hydrogen chloride to be lost.

(b) The procedure of Example 4(a) was repeated, except that the flow rate of water was increased in an attempt to form an 8 N acid stream without cooling. In this case, 46.9 kg/min of 20° C. water was used and 5.1 kg of water was boiled off. Calculation showed that the heat of reaction produced 6520 K Cal/min whereas the heat required to raise the water to boiling was 3735 K Cal/min, so that the excess 2765 K Cal caused the water to boil off, with consequent loss to hydrogen chloride.

In contrast, as can be seen from Example 1 above, when the aqueous phase is cooled to maintain the same below boiling, an 8 normal mixed acid stream can be satisfactorily obtained.

SUMMARY OF DISCLOSURE

In summary of this disclosure, the present invention provides a process for the production of chlorine dioxide while efficiently regenerating acid for the chlorine dioxide production procedure by reaction of coproduced chlorine with sulphur dioxide under temperature controlled conditions. Modifications are possible within the scope of this invention.

What I claim is:

1. In a process for the production of chlorine dioxide wherein chlorine dioxide and chlorine are formed in gaseous admixture with steam from an aqueous acid reaction medium to which are fed sodium chlorate, hydrochloric acid and sulphuric acid, and optionally sodium chloride, which is maintained at its boiling point under subatmospheric pressure and from which sodium sulphate precipitates as a by-product, chlorine dioxide solution is formed from the gaseous admixture, hydrochloric acid and sulphuric acid are formed by reaction of sulphur dioxide, chlorine and water in a reaction zone, and the hydrochloric acid and sulphuric acid are forwarded to the reaction medium, the improvement which comprises cooling said reaction zone sufficiently to maintain the reactants in said reaction zone at a temperature below the boiling point of water during said reaction, said cooling being achieved, at least in part, by effecting said reaction of sulphur dioxide, chlorine and water in a cooled falling film absorber in which the water forms the falling film and having integral cooling passages through which a cool heat exchange medium flows out of fluid flow communication with but in heat exchange with the falling film.

2. The process of claim 1 wherein a gaseous stream containing unreacted sulphur dioxide and chlorine is removed from said falling film absorber and is passed to a packed tower wherein the residual gases are absorbed and reacted in water to form a weak acid stream which is forwarded to said absorber.

3. The process of claim 2 including sensing the temperature of said weak acid stream and varying the flow rate of water to said packed tower in response to sensed temperatures outside a predetermined temperature range to maintain the temperature of said weak acid within said predetermined range.

4. The process of claim 1, 2, or 3 wherein the volume of air associated with the gaseous reactants in the falling film reactor is minimized.

5. In a process for the production of chlorine dioxide wherein chlorine dioxide and chlorine are formed in gaseous admixture with steam from an aqueous acid reaction medium to which are fed sodium chlorate, hydrochloric acid and sulphuric acid, and optionally sodium chloride, which is maintained at its boiling point under subatmospheric pressure and from which sodium sulphate precipitates as a by-product, chlorine dioxide solution is formed from the gaseous admixture, hydrochloric acid and sulphuric acid are formed by reaction of sulphur dioxide, chlorine and water in a reaction zone, and the hydrochloric acid and sulphuric acid are forwarded to the reaction medium, the improvement which comprises cooling said reaction zone sufficiently to maintain the reactants in said reaction zone at a temperature below the boiling point of water during said reaction, said cooling being achieved by effecting said reaction of sulphur dioxide, chlorine and water in a packed tower, passing hot mixed acid produced therein through an external heat exchanger to which cool heat exchange fluid is passed, recovering part of the cool mixed acid as said hydrochloric acid and sulphuric acid forwarded to said reaction zone, and mixing the remainder of the cool mixed acid with said water for forwarding to said packed tower.

6. The process of claim 1 or 5 wherein the chlorine is constituted at least in part by chlorine contained in said gaseous admixture.

7. A process for the production of chlorine dioxide, which comprises
reacting sodium chlorate with chloride ions and hydrogen ions in an aqueous acid reaction medium having a total acid normality of about 2 to about 4.8 normal to form chlorine dioxide and chlorine, said chloride ions being provided by hydrochloric acid alone or hydrochloric acid and sodium chloride and said hydrogen ions being provided by sulphuric acid and said hydrochloric acid,
maintaining said reaction medium at its boiling point at a temperature below that above which substantial decomposition of chlorine dioxide occurs while applying a subatmospheric pressure to a first reaction zone containing said reaction medium to form steam in a volume ratio of steam to chlorine dioxide of about 4:1 to about 10:1,
depositing anhydrous neutral sodium sulphate from the reaction medium and removing the same from said first reaction zone,
removing a gaseous mixture of chlorine dioxide, chlorine and steam from said first reaction zone and forming an aqueous solution of said chlorine dioxide and a gaseous chlorine stream therefrom, said aqueous solution of chlorine dioxide also containing part of said chlorine in said gaseous mixture,
forwarding the chlorine not dissolved in said chlorine dioxide solution to a second reaction zone to which sulphur dioxide and water are fed for reaction therein to form an aqueous mixture of hydrochloric acid and sulphuric acid having a total acid normality of about 6 to about 14 normal,
cooling said second reaction zone to maintain the temperature of the reactants therein at a temperature below the boiling point of water,
said cooling being achieved, at least in part, by effecting said reaction of sulphur dioxide, chlorine and water in a cooled falling film absorber in which the water forms the falling film and having integral cooling passages through which a cool heat exchange medium flows out of fluid flow communication with but in heat exchange communication with the falling film and
forwarding said aqueous mixture of hydrochloric acid and sulphuric acid and sulphuric acid to said reaction medium and feeding such additional quantities of hydrogen ions, chloride ions and sulphate ions to said reaction medium as are required by the stoichiometry of the reactions occurring in the reaction medium.

8. The process of claim 7 wherein said aqueous mixture of hydrochloric acid and sulphuric acid has a total acid normality of about 7 to about 9.

9. The process of claim 7 or 8 wherein said reactants in said second reaction zone are maintained at a temperature below about 70° C.

10. The process of claim 7 wherein a gaseous stream containing unreacted sulphur dioxide and chlorine is removed from said falling film absorber and is passed to a packed tower wherein the residual gases are absorbed and reacted in water to form a weak acid stream which is forwarded to said absorber.

11. A method for the production of hydrochloric acid and sulphuric acid, which comprises:
separately feeding chlorine, sulphur dioxide and water to a reaction zone,
intimately contacting said chlorine, sulphur dioxide and water to cause the same to react in the presence of excess water in accordance with the equation:

$$SO_2 + Cl_2 + 2H_2O \rightarrow 2HCl + H_2SO_4$$

to form an aqueous mixture of hydrochloric acid and sulphuric acid, and
cooling said reaction zone sufficiently to maintain the reactants in said reaction zone at a temperature below the boiling point of water during said reaction,
said reacton zone being defined at least in part by a falling film absorber in which the water forms the falling film and at least the majority of the sulphur dioxide and chlorine react and having integral cooling passages through which said cool heat exchange medium flows out of fluid flow contact with but in heat conducting relationship with said falling film.

12. The method of claim 11 wherein the flow rates of chlorine, sulphur dioxide and water to said reaction zone are such as to produce an aqueous mixture of hydrochloric acid and sulphuric acid having a total acid normality of about 6 to about 14 normal.

13. The method of claim 12 wherein said total acid normality is from about 7 to about 9 normal.

14. The method of claim 11 wherein said reaction zone is defined by said falling film absorber and a tail gas packed tower reactor, chlorine and sulphur dioxide are fed to the falling film absorber for reaction of the majority of the sulphur dioxide and chlorine therein with water in the form of a weak aqueous mixture of hydrochloric acid and sulphuric acid, unreacted sulphur dioxide and chlorine are forwarded from the falling film absorber to the tail gas reactor, and water is fed to the tail gas reactor to form intimate contact with said forwarded sulphur dioxide and chlorine to effect reaction therebetween to form said weak aqueous mixture of hydrochloric acid and sulphuric acid which is forwarded to said falling film absorber.

15. The method of claim 14 wherein said falling film in said falling film absorber is maintained at a temperature below about 70° C.

16. A method for the production of hydrochloric acid and sulphuric acid, which comprises:
separately feeding chlorine, sulphur dioxide and water to a reaction zone,
intimately contacting said chlorine, sulphur dioxide and water to cause the same to react in the presence of excess water in accordance with the equation:

$$SO_2 + Cl_2 + 2H_2O \rightarrow 2HCl + H_2SO_4$$

to form an aqueous mixture of hydrochloric acid and sulphuric acid, and
cooling said reaction zone sufficiently to maintain the reactants in said reaction zone at a temperature below the boiling point of water during said reaction,
said reaction zone being defined by a packed tower, to which said chlorine and sulphur dioxide are directly fed and to which said water is fed in admixture with cooled recycled mixed acid, a hot mixed acid stream of hydrochloric acid and sulphuric acid is removed from the packed tower and passed through a heat exchanger to which a cool heat exchange medium also is passed in order to cool the hot mixed acid, a proportion of the cooled mixed acid is recovered as a product stream, and the remainder of the cooled mixed acid is recycled to the reaction zone in said admixture with said water.

17. The method of claim 16 wherein said hot mixed acid stream removed from the packed tower has a temperature below about 70° C.

18. The method of claim 16 wherein the flow rates of chlorine, sulphur dioxide and water to said reaction zone are such as to produce an aqueous mixture of hydrochloric acid and sulphuric acid having a total acid normality of about 6 to about 14 normal.

19. The method of claim 18 wherein said total acid normality is from about 7 to about 9 normal.

20. A process for the production of chlorine dioxide, which comprises:
reacting sodium chlorate with chloride ions and hydrogen ions in an aqueous acid reaction medium having a total acid normality of about 2 to about 4.8 normal to form chlorine dioxide and chlorine, said chloride ions being provided by hydrochloric acid alone or hydrochloric acid and sodium chloride and said hydrogen ions being provided by sulphuric acid and said hydrochloric acid,
maintaining said reaction medium at its boiling point at a temperature below that above which substantial decomposition of chlorine dioxide occurs while applying a subatmospheric pressure to a first reaction zone containing said reaction medium to form steam in a volume ratio of steam to chlorine dioxide of about 4:1 to about 10:1,
depositing anhydrous neutral sodium sulphate from the reaction medium and removing the same from said first reaction zone,
removing a gaseous mixture of chlorine dioxide, chlorine and steam from said first reaction zone and forming an aqueous solution of said chlorine dioxide and a gaseous chlorine stream therefrom, said aqueous solution of chlorine dioxide also containing part of said chlorine in said gaseous mixture,
forwarding the chlorine not dissolved in said chlorine dioxide solution to a second reaction zone to which sulphur dioxide and water are fed for reaction therein to form an aqueous mixture of hydrochloric acid and sulphuric acid having a total acid normality of about 6 to about 14 normal,
cooling said second reaction zone to maintain the temperature of the reactants therein at a temperature below the boiling point of water,
said cooling being achieved by effecting said reaction of sulphur dioxide, chlorine and water in a packed tower, passing hot mixed acid produced therein through an external heat exchanger to which a cool heat exchange medium is passed, recovering part of the cool mixed acid forwarded to said reaction zone, and mixing the remainder of the cool mixed acid with said water for forwarding to said packed tower, and
forwarding said aqueous mixture of hydrochloric acid and sulphuric acid and sulphuric acid to said reaction medium and feeding such additional quantities of hydrogen ions, chloride ions and sulphate ions to said reaction medium as are required by the stoichiometry of the reactions occurring in the reaction medium.

21. The process of claim 20 wherein said aqueous mixture of hydrochloric acid and sulphuric acid has a total acid normality of about 7 to about 9.

22. The process of claim 20 or 21 wherein said reactants in said second reaction zone are maintained at a temperature below about 70° C.

* * * * *